May 21, 1929.  W. WRIGHT  1,713,587
TACKLE BLOCK
Filed Aug. 1, 1927
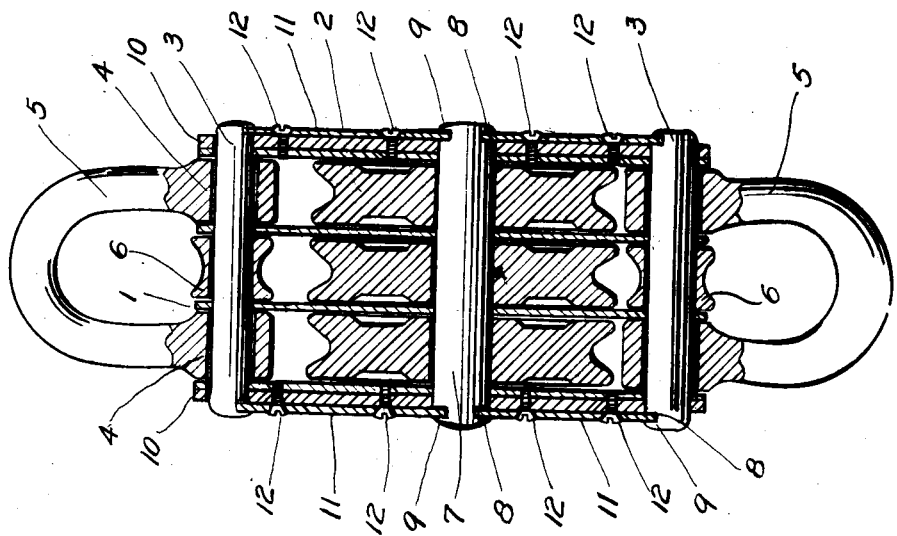
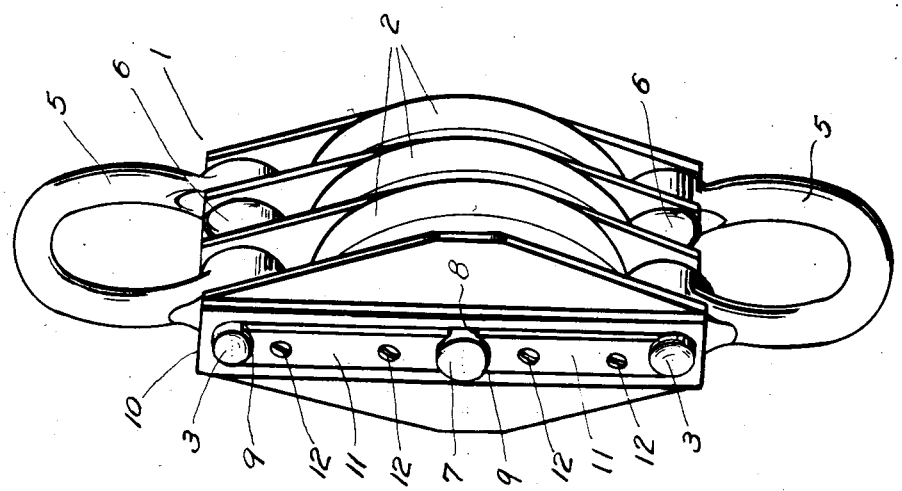
INVENTOR
*William Wright*
BY
ATTORNEY Patented May 21, 1929.

1,713,587

UNITED STATES PATENT OFFICE.

WILLIAM WRIGHT, OF TULSA, OKLAHOMA, ASSIGNOR TO OKLAHOMA IRON WORKS, OF TULSA, OKLAHOMA, A CORPORATION OF OKLAHOMA.

TACKLE BLOCK.

Application filed August 1, 1927. Serial No. 209,792.

My invention relates to tackle blocks and more particularly to a device of that character for hoisting heavy loads with a multiplication of power, as in oil well drilling or the like, and has for its principal object to provide a secure, compact arrangement of the tackle elements with elimination of such projecting parts as might engage a derrick or other equipment with damage to the same or to the block.

It is also an object of the invention to provide a block of this character wherein the shackle and axle pins are non-rotative to prevent wear on the body plates, but adjustable to extend the lives of pins worn by the sheaves or clevises.

In accomplishing these objects I have provided improved details of structure, the preferred forms of which are illustrated in the accompanying drawings, wherein:

Fig. 1 is a perspective view of a tackle block embodying my improvements.

Fig. 2 is a central, longitudinal section of the same.

A block embodying my invention includes the usual body plates 1 of a number dependent on the number of sheaves employed; the block illustrated in the present drawings including four body plates for carrying three rope sheave wheels 2; the body plates being spaced to provide free rotation of the sheaves by suitable rollers or other spacers, carried by tie pins 3 at the ends of the block. Here I illustrate the spacers for the outside and next inner plates as constituting the eyes 4 of shackle clevises 5, whereby the block is suspended from a rope or other support and whereby a tool or other article is suspended from the block. The inner body plates are spaced from each other by rollers 6, preferably having concave rope grooves for guiding ropes or cables used in connection with the block.

Extending through the transverse center of the block is an axle pin 7 carrying the sheave wheels in the usual manner.

Blocks of this character are usually held in assembled relation by nuts on the ends of the pins, engaging the outer faces of the outer body plates. With such construction, however, there is danger of the projecting ends of the pins, or the nuts on the pins, engaging under a part of the derrick, or equipment in the derrick, and damaging the derrick equipment or block, and the end pins being rotatable permit excessive wear on the plates.

To obviate the disadvantages mentioned and permit quick assembly of the block, I provide shackle and axle pins of a length to project but slightly beyond the outer frame plates and having transverse key grooves 8 in their outer ends forming retaining lips 9 of sufficient strength to hold the locking keys. Each of the shackle pins has but a single groove at each end, but the axle pin has two grooves at each end facing oppositely so that the groove at one side may co-operate with the groove in the pin in the end of the block at that side of the axle pin and the groove in the opposite side of the axle pin may co-operate with the groove in the shackle pin at the other end of the block.

Fitting over the ends of the pins are reinforcing bars 10 and lying against the outer faces of the reinforcing bars are key bars 11, each with its outer end seated in an inwardly facing groove in a shackle pin and its inner end seated in a mating groove in the axle pin.

With the ends of the pins at opposite sides of the block keyed as described, the plates are held in assembled relation but spaced by the shackle eyes and rollers to provide free rotation of the sheave wheels.

The key bars may be attached to the frame by screws 12 which project through the key bars and reinforcing bars into the outside frame plates.

A tackle block constructed as described may be easily and quickly assembled and is adapted for use in accordance with common practice, except that sway of the block causes pivotal action of the clevis eyes on the end pins as distinguished from rotation of the pins in the body plates, thereby avoiding wear on the body plates incident to thrust of the pin heads and nuts against the plates with blocks of previous constructions. Should the axle pin wear on its upper face, due to the rotation of the sheaves under weight of the load, the pin may be removed and reversed, providing a fresh rounded surface to the sheave wheel bushings and in this way doubling the life of the pin.

It is apparent, therefore, that I have provided a tackle block which may not only be easily and quickly assembled but one wherein the parts are reversible and, to some extent, interchangeable, and wherein such advantages are gained without sacrifice of strength or security.

What I claim and desire to secure by Letters Patent is:

1. A tackle block including spaced frame plates, a sheave pin having end portions extended beyond the frame plates and provided with oppositely facing transverse grooves, shackle pins having portions extended beyond the frame plates and having transverse grooves facing the grooves in the sheave pin, bars attached to the frame plates, each having its ends seated in facing grooves in the sheave pin and shackle pin, a sheave wheel on the sheave pin and shackles on the shackle pins.

2. A tackle block including spaced frame plates, a sheave pin having end portions extended beyond the frame plates and provided with oppositely facing transverse grooves, shackle pins having portions extended beyond the frame plates and having transverse grooves facing the grooves in the sheave pin, bars attached to the frame plates, each having its ends seated in facing grooves in the sheave pin and shackle pin, a sheave wheel on the sheave pin and shackles on the shackle pins, the sheave pin being reversible in its mounting and in locked relation to the shackle pins, for the purpose set forth.

3. A tackle block including frame plates, shackle and sheave pins carried by said plates and having transverse grooves, and key bars fixed to the frame plates and seated in the pin grooves to anchor the pins and space the frame plates.

4. A tackle block including apertured frame plates, shackle and sheave pins extended through the apertures in said frame plates and having transverse grooves in their outer ends, and key bars fixed to the outer faces of the frame plates and extended into the pin grooves to removably anchor the pins to the plates and removably anchor the plates in spaced relation on the pins.

5. The combination in a tackle block of apertured frame plates, a sheave pin extending through the apertures in said plates and having outer ends exposed beyond the outer faces of the plates, said projecting ends having transverse grooves and key bars fixed to the outer faces of the frame plates and seated in the pin grooves to anchor the pin to the plates and space the plates on the pin.

In testimony whereof I affix my signature.

WILLIAM WRIGHT.